United States Patent Office 3,513,230
Patented May 19, 1970

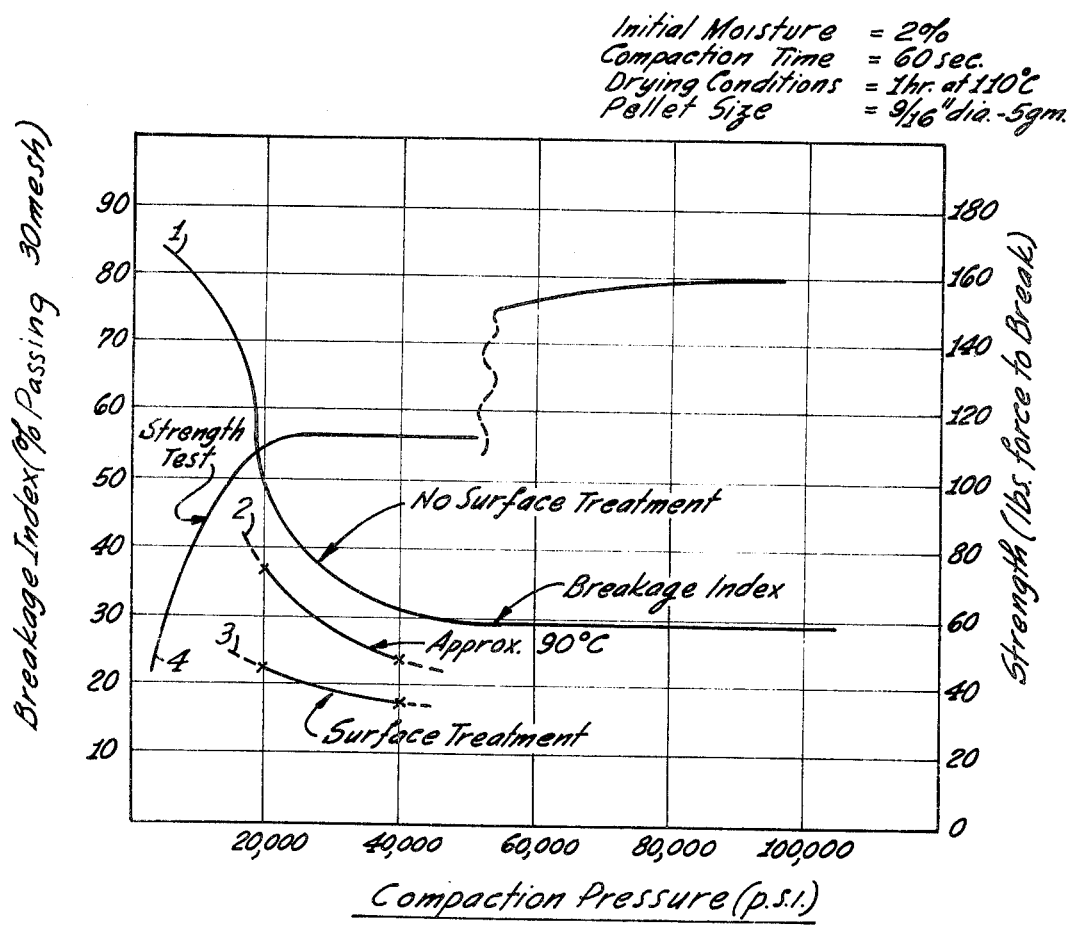

3,513,230
COMPACTION OF POTASSIUM SULFATE
Raymond C. Rhees, Whittier, and Howard N. Hammar, Los Alamitos, Calif., assignors to American Potash & Chemical Corporation, Los Angeles, Calif., a corporation of Delaware
Filed Apr. 4, 1967, Ser. No. 628,440
Int. Cl. B29j 1/00
U.S. Cl. 264—109             4 Claims

ABSTRACT OF THE DISCLOSURE

A process for improving the resistance to physical breakdown of potassium sulfate compacts formed by compacting particulate potassium sulfate feed material under pressure. The resistance to physical breakdown of such compacts is improved by controlling the moisture content of the feed material during compaction to between about 0.5% and 2.0% by weight and compacting the feed material at a pressure within the range of between about 12,000 and 40,000 p.s.i. The resistance of such compacts to physical breakdown is further improved by compacting the feed material at a temperature of approximately 90° C. The potassium sulfate compacts may be subjected to granulation to provide a quantity of granules having improved resistance to physical breakdown. The resistance of such granules to physical breakdown may be further improved by moistening the granules with water and thereafter evaporating the water from the moistened granules.

BACKGROUND OF THE INVENTION

The process of this invention relates to a compaction process for forming compacts from which coarse potassium sulfate granules may be obtained which are useful as fertilizer compositions, for example, having desirable attributes such as high resistance to physical breakdown, ease of handling and facility for uniformity and convenience of application.

Various methods, means, processes and techniques previously have been used for producing granular fertilizer materials. Some well known processes previously known for producing granular fertilizer materials include compaction, spheroidizing, pelletizing, fusion, nodulizing, and extrusion. Also, it is known to those familiar with the state of the art that coarse crystals may be grown. However, production costs for many previously known techniques and processes, including the growing of coarse crystals, are significantly high so as to seriously restrict commercial marketing whereby commercial fertilizer compositions in coarse granular form may have universal acceptance and widespread utilization.

It has been found to be characteristic of the aggregated materials produced by the techniques and processes previously known to those familiar with this art, that such materials tend to break down in handling. The breakdown of materials prepared by previously known techniques and processes has been found to be aggravated when the materials are exposed to high humidities.

Heretofore potassium sulfate has been particularly resistant to the formulation of coarse aggregates which have the physical properties for resisting reconversion to fine particles in conveying, shipping and in application. In efforts to create a process for pelletizing or compacting various materials pressures in the range of 5,000 to 12,000 p.s.i. have been used. Also, it is known that the agglomeration of muriate of potash by compacting or briqueting has been accomplished. However, pressures in the range of 100,000 pounds per square inch were required for producing the agglomeration of muriate of potash.

SUMMARY

The process for the compaction of potassium sulfate in accordance with this invention includes subjecting particulate potassium sulfate feed material to compacting pressures within a critical pressure range to produce a highly improved, commercially desirable product. By means of the process of this invention potassium sulfate compacts thereby formed may be converted into coarse granules of uniform size, if desired, for inclusion as constituents in the formulations of fertilizer compositions, for example. By means of the process of this invention coarse granular potassium sulfate has been produced for use in fertilizer compositions, whereby the granular form potassium sulfate is highly resistant to physical breakdown and possesses improved physical properties which overcome other disadvantages and problems previously associated with the utilization of potassium sulfate in granular form and as a constituent in the formulation of fertilizer compositions.

It has been found that both the strength and breakage index of the potassium sulfate products are significantly improved when compaction pressure is increased up to the range of 40,000 p.s.i. Also it has been discovered that the fastest rate of gain in the improvement of physical properties occurs when compaction pressure is increased from pressures below 20,000 p.s.i. and that the maximum rate of gain in physical property improvement below 20,000 p.s.i. compaction pressure occurs when compaction pressure is increased within the 12,000 to 20,000 p.s.i. range. Therefore, it thereby has been established that a critical pressure range for the application of compaction pressure to potassium sulfate feed material exists, and that such pressure application within the critical pressure range is a prerequisite for the attainment of physical property characteristics required for potassium sulfate compacts.

In perfecting the process of this invention it has been established that the physical properties of granulated potassium sulfate may be improved by further treatment of the potassium sulfate feed material. In particular, it has been established that the physical properties may be improved by adjusting the moisture content of the feed material prior to the application of compaction pressures within the critical pressure range, as indicated above, to the potassium sulfate feed material. Further, when particulate potassium sulfate feed material is heated to a temperature approaching the boiling point of water, prior to the application of compaction pressure within the critical pressure range established by the process of this invention, potassium sulfate granules ultimately produced possess physical properties which are considerably improved over those physical properties obtained by applying compaction pressures to cold, or room temperature, potassium sulfate feed material, and additionally, that less compaction pressure is required for obtaining the desired physical properties. Further, particle size distribution of the feed material is effective in the attainment of desired physical properties. Also a rewetting of the granular material is effective in the improvement of the physical properties in that the rewetting of the material facilitates the absorption of water into the voids within the material which thereby further promotes a bonding of the individual particulate potassium sulfate granules. It has been observed that a maximum benefit from rewetting may be obtained if feed materials are compacted at pressures within the critical pressure range as indicated above.

The novel features considered characteristic of this invention are set forth with particularity in the appended claims. The invention itself, as well as additional advantages thereof, may best be understood by reference to the following description and the accompanying drawing, in which:

DESCRIPTION OF THE DRAWING

The drawing is a graphical plot of curves showing changes in the physical properties of potassium sulfate compacts, curve 1 showing the effects of compaction pressure on the breakage index of granules obtained from the compact; curve 2 showing the effects of preheating feed material relative to the breakage index; curve 3 showing the effects of surface treatment on the breakage index; and curve 4 showing the effects of compaction pressure on the strength of compact.

DESCRIPTION OF THE INVENTION

The process of this invention may best be understood by reference to the graphical plots shown in the drawing. Thus, curve 1 shows the effects of compaction pressures ranging from 0 to 100,000 p.s.i. plus, on the breakage index for potassium sulfate granules obtained from compacts made in accordance with this invention. Breakage index has been used as a criteria for establishing a resistance factor for granular potassium sulfate to revert to fine particles. The breakage index has been established by measuring the percentage of −8 to +30 mesh material reduced to less than 30 mesh size when potassium sulfate material is shaken with steel balls on 18 and 30 mesh screens. By establishing a breakage index for indicating the percentage of material which is reduced to −30 mesh, an indication thereby is given for the resistance of such material to being reduced to fine particles.

In establishing the breakage index, potassium sulfate compacts prepared in accordance with this invention were passed through granulation equipment and then screened. Granules having a size of between −8 to +18 mesh were left on the 18 mesh screen. Granules having a size of between −18 to +30 mesh were left on the 30 mesh screen. The total quantity of granules was distributed between the two screens such that about ¾ the quantity was on the 18 mesh screen and about ¼ the quantity on the 30 mesh screen. Steel balls were placed on each screen. The screens were appropriately provided with covers and collecting pans. The screens, with covers and pans, were then placed on a Ro-tap shaker and subjected to vibratory and oscillatory movement for a period of sixty minutes. The breakage index, indicated on the left vertical axis shown in the drawing was established as the percentage of the product subjected to this test which was collected in the collecting pans after the Ro-tap shaker had been in operation for sixty minutes.

The strength test conducted for establishing the values plotted in curve 4 of the drawing consisted of measuring the maximum force, in pounds, required to break a potassium sulfate compact into two or more approximately equal portions. The results obtained, i.e. measurements in pounds of force required to break the potassium sulfate compacts, is shown as curve 4, with values in pounds of force plotted along the right vertical axis of the drawing. In establishing the strength index as shown by curve 4, force was applied to a 0.064 inch diameter plunger which was in contact with the potassium sulfate compact. The average values obtained from testing a large number of potassium sulfate compacts were used in establishing the curve 4.

In the practice of the process of this invention, subjection of the potassium sulfate feed having a moisture content adjusted to 0.5 to 2.0 percent by weight to the defined compaction pressures for approximately sixty seconds results in a final moisture content of the potassium sulfate within the 0.5 to 2.0 percent range. Preferably a moisture content of 2.0% is attained. As indicated by curve 4 of the drawing the maximum desirable physical property characteristics are attained at compaction pressures of approximately 40,000 p.s.i. However, a completely satisfactory and highly desirable potassium sulfate product is obtained when potassium sulfate feed material is subjected to compaction pressures within the aforementioned critical pressure range of from approximately 12,000 to 20,000 p.s.i.

Referring to curve 2 of the drawing it is seen that in the practice of the process of this invention it further has been established that the compaction pressure-breakage index relationship for potassium sulfate products, as shown in curve 1, may be improved by preheating the potassium sulfate feed material prior to subjecting the material to compaction pressure. By preheating the feed material to approximately 90° C. an improved product thereby is obtained, as indicated by curve 2. Not only is an improved product obtained by preheating the feed material but also, it has been established that an equivalent product may be obtained by applying lower compaction pressure when the feed material has been preheated.

It is well recognized that by controlling the particle size distribution of particles within the feed material prior to the application of compaction pressures thereto an improvement in the breakage index of granules made from the compact is attained. This effect relates to the packing characteristics of the particles used within the feed material and involves selecting a proper distribution of particles for providing smaller particles which fit within the spaces or voids existing between larger particles. Thus a bimodal particle size distribution produces a better compact product, at the same compacting pressure, than that produced by a sharp monomodal distribution. In the practice of the process of this invention it has been recognized that when one-third undersize material, of −30 mesh for example, is mixed with two-thirds regular size potassium sulfate and thereafter the mixture compacted, i.e. subjected to compacting pressures, a very favorable breakage index of 23 for the granules obtained from the compacted product thereby is attained. However, when 100% regular size potassium sulfate feed material is subjected to appropriate compaction pressures a breakage index of 30 is attained for the resulting granules. It was observed, however, that when 20% of −100 mesh undersize potassium sulfate feed material is incorporated into regular size feed material an unfavorable breakage index of 41 is obtained. In the practice of the process of this invention it was established that feed materials having sharper particle sized distribution, monomodal distribution, produced poor compact products, while distribution tending toward bimodal distribution, i.e. appropriate ratio of large to small particles, produced a much improved compact product.

In establishing the effect of preheating feed material, as it relates to compaction pressure and breakage index, tests were made for feed materials which were heated from room temperature to approximately 90° C. Compaction pressures of 20,000 p.s.i. and 40,000 p.s.i. were applied to the preheated feed material. It was observed that with a compaction pressure of 20,000 p.s.i. the breakage index for granules obtained from the compacted product decreased, i.e. improved, from a value of 48 at room temperature to a value of 38 when the feed material was heated to approximately 90° C. Also, with a compaction pressure of 40,000 p.s.i. the breakage index for granules obtained from the compacted product improved from a value of 32 to a value of 25 as a result of increasing the temperature of the feed material from room temperature to approximately 90° C.

The compacted granular product produced by the process of this invention further can be improved by rewetting and redrying the sized granulated product, as indicated by curve 3 in the drawing. The rewetting of the sized granular product facilitates the absorption of water into the particle voids further promoting particle-to-particle bonding. The evaporation of the absorbed water from the surface of the individual particle promotes interparticle crystallization which thereby further strengthens the individual particles. It has been observed that maximum benefit of rewetting the particles is obtained if the particles are subjected to compacting pressures which are within the critical pressures as indicated above. It is recognized that granular products which have been poorly compacted are able to absorb excess water which thereby weakens, by dissolution, the relatively weak particle-to-particle bonds previously established within the poorly compacted product.

At temperatures approaching the boiling point of water, where water vapor pressure is high, water vapor displaces air in the loose feed material. When the feed material is subjected to the high compacation pressures the water vapor condenses. Thus, air trapped between feed material particles thereby is displaced, and the resistance offered by the trapped air to compaction thereby is decreased.

When critical compaction pressures, as indicated above, are applied to potassium sulfate feed material the natural bridging effect which occurs between feed material particles which have been loosely packed together thereby is broken down. A given weight of feed material subjected to critical compaction pressure, as indicated above, assumes minimum volume and the compacted product thereby attains maximum density. The moisture content present under optimum conditions for carrying out the compaction process of this invention serves as a lubricant for the movement of the particles within the feed material, and also aids particle-to-particle bonding. It is recognized that feed material having a moisture content greater than 2.0% may be fed to the compaction device. However, such a greater moisture content will merely be squeezed from the compact product when the compacting pressures are applied. Further, it is recognized that the presence of excessive water squeezed from the compacted product could present varied difficult problems relating to the operation of an industrial compaction plant.

By the use of varying combinations of the beneficial procedures, as indicated above, recognized as being a part of the process of this invention, potassium sulfate may be compacted into compacts which, after granulation, gives granules having various values of breakage indices as determined by the procedures for establishing breakage index indicated above. For example, by controlling the moisture content and compaction pressure a breakage index of between 20 and 40 may be attained for the granules obtained from the compacted product. By the additional control of feed material temperature prior to compaction, and by appropriate particle size distribution a breakage index of 20 or less may be attained. Additionally, a breakage index of 10±5 may be attained by rewetting and redrying the potassium sulfate granules obtained.

In the practice of the process of the invention, potassium sulfate feed material having a moisture content of about 2%, was made into compacts. The compacts were made in a 9/16 inch diameter tungsten carbide die designed so that pressure could be applied at both the top and the bottom surfaces of the die. The die was assembled except for a top plunger and heated to 110° C. in an oven. The die was removed from the oven and a premeasured amount of the potassium sulfate was placed in the die and the top plunger inserted. The feed material then was subjected to compaction pressure. The products were dried for one hour at 110° C. and then tested for both strength and breakage index by procedures set forth hereinbefore.

Referring to the drawing, it is seen that both the strength test and the breakage index test show that increasingly better physical properties may be attained by increasing compaction pressure up to 40,000 p.s.i. Also, it may be seen by reference to the drawing that the fastest rate of gain in the improvement of physical properties will occur with pressure increases within the 12,000 to 20,000 p.s.i. range.

By reference to the drawing it is seen that the strength test curve 4 levels off at a somewhat lower pressure value than do the breakage index curves 1, 2 and 3. This is predictable inasmuch as it is recognized that the strength test is greatly affected by the surface of the compacted product while the breakage index test is not so affected. It is recognized that the bridging effects at the surface of the compacted product are easier to collapse than the internal bridging effects within the compacted product.

The discontinuity in the strength curve 4 between 50,000 and 60,000 p.s.i. compaction pressure is related to the dependency of the strength test on conditions at the surface of the compacted product. At these high compaction pressures a 2.0% water content in the potassium sulfate is an excessive amount of water to be retained in the small void volume between particles at these high pressures. Consequently, some extrusion of water occurs. The extruded water is reabsorbed by the compacted product when the high compaction pressures are released. Thus, a rewetting and redrying of the compact surface is effected which thereby produces a compact surface treatment resulting in a strengthening of the compact product in a manner as indicated hereinbefore.

In perfecting the process of this invention minor amounts of various ingredients have been experimented with in the search for binding agents capable of increasing product resistance to breakdown. Sulfuric acid proved to offer possibly the best results of the binding agents tested. However, small beneficial effects were noted from the use of ingredients and additives intended to produce a product which would have a resistance to breakdown commensurate with the compacted product produced by the process of this invention.

It is recognized that maximum beneficial results may be obtained by the process of this invention when compacted potassium sulfate products are produced by subjecting potassium sulfate feed material to critical compaction pressures as indicated hereinbefore. Further, it is recognized that additional evidence indicates that at extremely high compaction pressures, much greater than the critical compaction pressures used by the process of this invention, adverse results are produced which are contrary to and unlike the beneficial results produced by the process of this invention.

Fertilizer compositions increasingly are being prepared and applied in coarse granular form. Fertilizers in coarse granular form have a number of advantages, such as ease of handling, decreased dusting, ease and uniformity of application. These advantages are realized only if the constituents in the fertilizer formulations, such as nitrogen, phosphorous and potassium, have matching particle size and resist physical breakdown in handling. Potassium sulfate is one desirable form for the incorporation of potassium into fertilizer formulations. Therefore, it is especially desirable to produce a coarse granular potassium sulfate product which additionally is highly resistant to physical breakdown. Thus the practice of the process of this invention provides a production process for a potassium sulfate compact which is highly useful as a constituent in fertilizer compositions either directly or after passage through suitable granulation equipment.

While a specific die and plunger device has been referred to in describing the practice of the process of this invention it is to be understood that any device, or any pressure application technique useful for collapsing or otherwise reducing the bridging effect between the feed material particles constitute suitable means and techniques for the practice of the process of this invention.

What is claimed is:

1. A process for preparing a compact of particulate potassium sulfate having improved resistance to physical breakdown consisting of:
   (a) placing within a heated compacting means particulate potassium sulfate having a moisture content adjusted to about 0.5 to 2.0 percent by weight, (b) applying a compacting pressure upon said potassium sulfate of about 12,000–40,000 p.s.i. to form a compact of the same moisture content and (c) relieving said pressure and drying said compact to thereby form said breakdown-resistant compact.

2. The process as set forth in claim 1 in which said compacts are subjected to granulation to provide a quantity of granules having improved resistance to physical breakdown.

3. The process defined in claim 1 in which the resistance to physical breakdown of the compacts is further improved by compacting said potassium sulfate feed material preheated to a temperature of approximately 90° C.

4. The process defined in claim 2 in which the resistance to physical breakdown of the granules is further improved by moistening said granules with water and thereafter evaporating the water from the moistened granules.

References Cited

UNITED STATES PATENTS

| 2,082,809 | 6/1937 | Pennell | 71—61 |
| 3,231,649 | 1/1966 | Pfeiffer | 264—109 |

OTHER REFERENCES

Perry et al., Chemical Engineers' Handbook, 4th ed. 1963, McGraw-Hill Book Co., N.Y. pp. 8–60.

DONALD J. ARNOLD, Primary Examiner

J. R. HALL, Assistant Examiner